Patented June 7, 1927.

1,631,722

UNITED STATES PATENT OFFICE.

HERBERT W. EMERY, OF HOLLISTON, MASSACHUSETTS, ASSIGNOR TO ARCHER RUBBER COMPANY, OF MILFORD, MASSACHUSETTS, A CORPORATION OF MASSACHUSETTS.

PROCESS OF SURFACE-FINISHING RUBBER GOODS AND PRODUCT OF SAME.

No Drawing.   Application filed November 3, 1926. Serial No. 146,065.

This invention has relation to surface-finished rubber goods and a process of making the same, and, while the process hereinafter described is applicable for the surface treatment of rubber articles such as rubber footwear, water bags, etc., it is particularly intended and suited for the surface-finishing of rubberized or rubber-coated sheeting, such as is extensively utilized in the manufacture of waterproof garments, traveling bags, tobacco pouches, and the like. Such rubberized sheeting consists of a fabric backing, such as cotton cloth, coated on either or both faces by the usual calendering or spreading process with a rubber compound.

The trade frequently desires that such rubberized sheeting possess a lustrous or semi-lustrous finish. To impart such finish, a coating of shellac is frequently employed as the luster-imparting or glazing agent, but this agent presents the ineluctable condition of being susceptible to smudging or soiling, and of wearing or scuffing off rapidly in use. Furthermore, a shellac coating is vulnerable to scratching or marking in handling, and imparts a wrinkled appearance to the sheeting.

I have discovered that if a glaze-imparting coating of the character of a lacquer or kindred material comprising shellac and capable of being hardened or indurated by halogenization, is applied to the rubberized sheeting, and is then halogenized, a hard, protecting coating or skin is formed, which bonds tenaciously with the rubber surface and is not liable to scuffing off or to the receiving of scratches or marks. The halogenization of the shellac is effected by treating the shellac-coated and cured rubberized material in an atmosphere of free halogen or sulphur halide, or with a solution thereof. The halogenizing agent not only indurates the shellac coating to effect a more intimate bond with the rubber surface, but also penetrates or strikes through the coating to the rubber surface to indurate or harden the same. The surface-hardened product may be, and preferably is, neutralized, as by passage through an atmosphere of ammonia.

The fabric backing employed may be cotton cloth, which is preferably stained or impregnated on its outer or non-coated face prior to rubberizing with a dilute solution of rubber, as by a spreading operation. This not only closes the openings or interstices of the fabric, and renders it water-resistant, but also imparts thereto the property of closing up perforations caused by pricking it with a needle or pin. The fabric may be rubberized by the usual calendering or spreading process.

The rubber mix or compound employed for rubberizing contains sulphur, such softeners, vulcanization accelerators, fillers, and pigments of the desired character, depending on the characteristics which it is desired to impart to the finished product.

The rubber compound may then be applied to either or both faces of the fabric to the desired thickness by the usual calendering process. After calendering, the rubber coating is more or less tacky or sticky. To prevent the convolutions from sticking together at the wind-up roll of the machine, an agent capable of rendering the rubber non-sticky, e. g., a soap solution, is preferably applied to the surface of the sheet prior to winding.

The rubberized sheeting may then be festooned over pipes or bars in the usual dry or steam-heated vulcanizer, and hot cured at the desired temperature for the requisite period of time, depending upon the composition of the rubber compound.

After the rubberized sheeting has been cured, a solution of shellac is applied one or more times to the rubber surface, by any suitable method or means. Thus the shellac solution may be applied with the usual spreading machine, by maintaining a supply of the solution in front of the usual doctor or knife stationed above the spreader roll, over which the sheeting passes under the knife. The shellac solution may be of relatively low strength, inasmuch as only a very thin coating or skin of indurated shellac is necessary to impart the desired surface characteristics to the finished product. For example, the solution may be made up by dissolving shellac in methyl alcohol or equivalent solvent. Glycerine in desired small amount may, if desired, be added to the solution, this component, it is believed, functioning to prevent the finished product from squeaking when rubbed, and also to dull down slightly the glaze or luster. By regulating the percentage of glycerine in the solution, the finish of the product may be varied from a semi-luster to a high luster. One or more applications of the shellac solution to the rubber surface may be made to produce a lustrous skin or coating of the proper caliper.

The product is then superficially indurated by halogenization or treatment in an atmosphere of free halogen or sulphur halide, or with a solution thereof. For example, the shellacked surface may be treated one or more times to produce the desired induration, with a solution of bromine or sulphur chloride in carbon tetrachloride, or with a solution of sulphur bromide in carbon tetracholride. A treating solution made up by dissolving bromine or sulphur chloride in carbon tetrachloride, or by dissolving bromine and sulphur in carbon tetrachloride, may be employed,—the solution preferably being applied a number of times to produce the desired induration. The solution not only indurates the shellac, to produce a tough, hard skin or coating which tenaciously bonds with the rubber surface, but also penetrates to the rubber surface and indurates the same. The surface-indurated product may finally be neutralized as by passage through an atmosphere of ammonia. The indurated surface is smooth and lustrous, and does not readily receive marks or scratches to give a wrinkled appearance, even when the material is "green", i. e., directly after manufacture.

If desired, the procedure may be somewhat modified. Thus, the surface of the vulcanized sheeting may be indurated prior to the application of the shellac, by treating preferably a number of times with the halogenizing solution, whereupon the shellac may be applied thereto, and the shellac surface finally indurated preferably by more than one application with a similar halogenizing solution. By this latter procedure, the rubber surface is hardened directly, rather than depending upon the penetration of the halogenizing agent through the shellacked surface.

If pigments such as ultramarine blue, or the like, have been compounded with the rubber, the induration of the product is preferably effected in an atmosphere of the halogenizing agents, for the reason that the application of a solution of the agent is liable to discolor or cause streaks in the product.

It should be noted that where the rubber compound is applied to the fabric backing by the usual spreading process rather than by calendering, sulphur may be omitted as a constituent of the rubber compound, and a "cold or acid cure" of the product in an atmosphere of sulphur chloride may be practiced between spreads. The cured product may then be shellacked and indurated by halogenization, as previously.

Having thus described this invention, it is evident that various changes might be resorted to without departing from the spirit or scope of invention as defined by the appended claims.

What I claim is:

1. A process of superficially finishing rubber goods which comprises applying to the rubber surface a coating of lacquer comprising shellac and capable of being hardened by halogenization and halogenizing the lacquered surface.

2. A process of superficially finishing rubber goods, which comprises applying a shellac coating to the rubber surface and then halogenizing the shellacked surface.

3. A process of superficially finishing cured rubber goods, which comprises applying a shellac coating to the rubber surface and then halogenizing the shellacked rubber surface.

4. A process of superficially finishing shellacked rubber goods, which comprises halogenizing the shellacked rubber surface.

5. A process of superficially finishing rubberized sheeting, which comprises curing the sheeting, applying a solution of shellac to the rubber surface, and finally halogenizing the shellacked surface.

6. A process of superficially finishing rubberized sheeting, which comprises curing the sheeting, halogenizing the rubber surface, applying a solution of shellac thereto, and finally halogenizing the shellacked surface.

7. An article of manufacture, comprising cured rubber goods having a coating of halogenized shellac.

8. An article of manufacture, comprising cured rubber goods, the rubber surface of which is halogenized and coated with halogenized shellac.

9. An article of manufacture, comprising cured rubberized sheeting, the rubber surface of which is coated with halogenized shellac.

10. An article of manufacture, comprising cured rubberized sheeting, the rubber surface of which is halogenized and coated with halogenized shellac.

11. In the preparation of flexible, rubberized fabrics, those steps which comprise the application of a shellac coating thereto, and the treatment of such coating with a halogen.

12. A process of finishing rubber goods, which comprises applying a shellac coating to the rubber surface, halogenizing the shellacked surface thereby surface-hardening the same, and neutralizing the surface-hardened product.

13. A process of finishing rubberized fabrics, which comprises applying a shellac coating to the rubber surface halogenizing the shellacked surface thereby surface-hardening the same, and treating the surface-hardened fabric in an atmosphere of ammonia.

In testimony whereof I have affixed my signature.

HERBERT W. EMERY.